United States Patent
Sontag et al.

(10) Patent No.: US 10,331,269 B2
(45) Date of Patent: Jun. 25, 2019

(54) MATRIX TOUCH SURFACE OF LARGE DIMENSIONS COMPRISING DOUBLE INJECTION ELECTRONICS OF THE ROWS OR OF THE COLUMNS

(71) Applicant: THALES, Courbevoie (FR)

(72) Inventors: Yves Sontag, Bordeaux (FR); Philippe Coni, Saint Jean d'illac (FR); Jean-Christophe Abadie, Biganos (FR); Frédéric Renaud, Mios (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/644,551

(22) Filed: Jul. 7, 2017

(65) Prior Publication Data

US 2018/0018059 A1 Jan. 18, 2018

(30) Foreign Application Priority Data

Jul. 13, 2016 (FR) ...................... 16 01096

(51) Int. Cl.
| | |
|---|---|
| *G09G 1/00* | (2006.01) |
| *G06F 3/041* | (2006.01) |
| *G06F 3/044* | (2006.01) |
| *H04L 7/00* | (2006.01) |

(52) U.S. Cl.
CPC ............ *G06F 3/0418* (2013.01); *G06F 3/044* (2013.01); *G06F 3/0416* (2013.01); *H04L 7/0008* (2013.01); *G06F 2203/04104* (2013.01); *G06F 2203/04111* (2013.01)

(58) Field of Classification Search
CPC .. G09G 3/30; G09G 5/00; G06F 3/041; G06F 3/044; G06F 13/40
See application file for complete search history.

(56) References Cited

U.S. PATENT DOCUMENTS

| | | | |
|---|---|---|---|
| 2008/0158175 A1* | 7/2008 | Hotelling | G06F 3/0418 345/173 |
| 2009/0109190 A1 | 4/2009 | Elias | |
| 2014/0362310 A1 | 12/2014 | Nanbu | |
| 2015/0185935 A1 | 7/2015 | Jang et al. | |
| 2016/0117023 A1 | 4/2016 | Hotelling et al. | |
| 2017/0090668 A1* | 3/2017 | Agarwal | G06F 3/0418 |

* cited by examiner

*Primary Examiner* — Michael A Faragalla
(74) *Attorney, Agent, or Firm* — Baker & Hostetler LLP

(57) ABSTRACT

A device with touch surface with projected capacitive detection comprising a matrix touchscreen comprises a plurality of conductive rows and of conductive columns, the screen linked to electronic control means generating, for each conductive row and for each conductive column, transmission signals and electronic means for receiving and analyzing the reception signals from each conductive row and from each conductive column. Each row of the device comprises, at one of its ends, first means for generating a first transmission signal and first means for receiving a first reception signal and, at its opposite end, second means for generating a second transmission signal and second means for receiving a second reception signal, the first transmission signal and the second transmission signal being synchronous, having the same frequency, the same amplitude and the same phase.

5 Claims, 3 Drawing Sheets

MATRIX TOUCH SURFACE OF LARGE DIMENSIONS COMPRISING DOUBLE INJECTION ELECTRONICS OF THE ROWS OR OF THE COLUMNS

CROSS-REFERENCE TO RELATED APPLICATIONS

This application claims priority to foreign French patent application No. FR 1601096, filed on Jul. 13, 2016, the disclosure of which is incorporated by reference in its entirety.

FIELD OF THE INVENTION

The field of the invention is that of the matrix touch surfaces of "projected capacitive" type. More particularly, the technical field is that of the matrices of large dimensions.

BACKGROUND

The general principle of operation of a matrix touch surface of "projected capacitive" type consists in measuring the capacitance variations caused by the touches that are to be detected. Two scanning modes are usually used. In the so-called "self capacitance" mode, the capacitance of each row and of each column of the matrix is tested. In the "mutual capacitance" mode, all the intersections between the different rows and columns are tested. When the touch surface is of large size and it comprises a large number of rows and columns, the "mutual capacitance" mode cannot be used alone because the scanning time is too long. It is, generally, used to complement a scanning of the "self capacitance" type.

In the latter mode, the injection and the measurement of the signal can be done in different ways. One of the standard modes is to inject sinusoidal signals at particular frequencies. This method offers the advantage of minimising the radiated emissions and of allowing the simultaneous use of several so-called "orthogonal" frequencies. For the record, two frequencies are said to be orthogonal if there are two integer numbers that are not multiples of one another such that the product of the first integer number by the first frequency is equal to the product of the second integer number by the second frequency.

The measurement of the signal can be done by capacitive bridge, by injecting a current and by measuring a voltage or, conversely, by injecting a voltage and by measuring a current. FIG. 1 illustrates the latter mode of operation. This figure schematically represents a touch matrix M comprising a plurality of rows Li and of columns Cj. The addressing electronics EL of the rows and EC of the columns schematically comprise:

a digital-analogue conversion stage DAC, which injects a sinusoidal high frequency voltage denoted V onto the row or the column of the touch surface an analogue-digital conversion stage ADC for measuring the received current.

The measurement of the current is ensured by an electronic processing chain which determines the position of the touch or touches on the touchscreen and ensures the retransmission of the processed signals externally, generally to a display device coupled with the touchscreen. Depending on the hardware resources available, measurements can be made on several rows simultaneously. In the same way, the measurements can be done at the same time on the columns, subject to the use of a second frequency F2 different from the first frequency F1 of the rows. The hardware resources necessary depend on the number of rows and of columns of the touch surface an on the desired scanning time.

When the matrix sizes increase, this method presents a certain number of drawbacks linked to the following physical parameters:

resistivity of the row and column access lines because of their small width and of the materials used;

capacitance of the rows and of the columns which increase with their dimensions;

resistivity of the actual rows and columns due to the transparent material used. In some applications, the optical performance requirements prohibit the use of materials that are less resistant but also less transparent.

Ultimately, on the matrices of large dimensions, a loss of sensitivity is observed when the touch is situated at row end. Generally, as illustrated in FIG. 2, to resolve this problem, two matrix touchscreens M1 and M2 are juxtaposed side by side to form a double-size touchscreen. By using different frequencies F1, F2 and F3, F4 from one screen to the other, any uncontrolled interaction is avoided. The main drawback with this solution is that there is a central discontinuity between the two touchscreens which is prejudicial to the good perception of the overall image.

SUMMARY OF THE INVENTION

The device according to the invention does not present the above drawbacks. It makes it possible to use a touchscreen of very large dimensions without major modifications thereto by injecting and by receiving the measurement signals. More specifically, the subject of the invention is a device with touch surface with projected capacitive detection comprising a matrix touchscreen comprising a plurality of conductive rows and of conductive columns, said screen being linked to electronic control means generating, for each conductive row and for each conductive column, transmission signals and electronic means for receiving and analysing the reception signals from each conductive row and each conductive column, characterized in that each row comprises, at one of its ends, first means for generating a first transmission signal and first means for receiving a first reception signal and, at its opposite end, second means for generating a second transmission signal and second means for receiving a second reception signal, the first transmission signal and the second transmission signal being synchronous, having the same frequency, the same amplitude and the same phase.

Advantageously, the first reception means and the second reception means comprise synchronous demodulation means and means for storing:

reception signals demodulated in the absence of touches, called reference signals, the value of each reference signal from the left end of a row being denoted $M_{REFG}$ and the value of each reference signal from the right end of the same row being denoted $M_{REFD}$, reception signals demodulated in the presence of touches, the value of each signal from the left end of a row being denoted $M_G$ and the value of each signal from the right end of the same row being denoted $M_D$.

Advantageously, when a touch is detected, the position of said touch is calculated from the raw ratio $R_B$ of the difference between the values of the signals $M_D$ and $M_{REFD}$ and of the difference between the values of the signals $M_G$ and $M_{REFG}$, i.e. $R_B = (M_D - M_{REFD})/(M_G - M_{REFG})$.

Advantageously, when a touch is detected, the position of said touch is calculated from the corrected ratio $R_C$ multiplied by the ratio of the signals $M_{REFG}$ and $M_{REFD}$, i.e. $R_C = R_B (M_{REFG}/M_{REFD})$.

Advantageously, when the row is cut, depending on the location of the cut, either the ratio between the values of the signals $M_D$ and $M_G$, or the raw ratio $R_B$, or the corrected ratio $R_C$ is altered, making it possible to detect the cut and its location.

Advantageously, in case of multiple touches, the values of the demodulated reception signals obtained on the rows and the values of the demodulated reception signals obtained on the columns make it possible to unambiguously determine the location of the multiple touches.

Advantageously, the transmission frequency is situated between 10 kHz and 300 kHz.

BRIEF DESCRIPTION OF THE DRAWINGS

The invention will be better understood and other advantages will become apparent on reading the following description given in a nonlimiting manner and from the attached figures in which.

DETAILED DESCRIPTION

Figure 1:
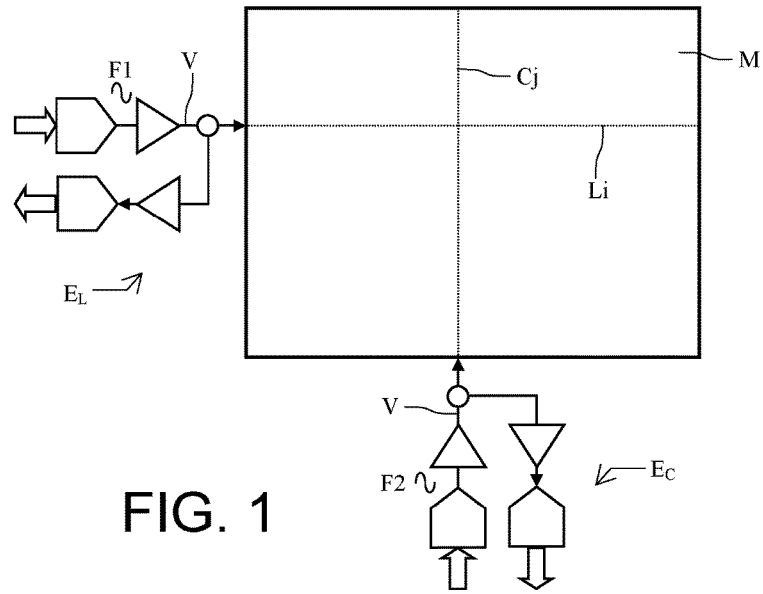
FIG. 1 represents the principle of operation of a matrix touch surface of projected capacitive type according to the prior art.
Figure 2:
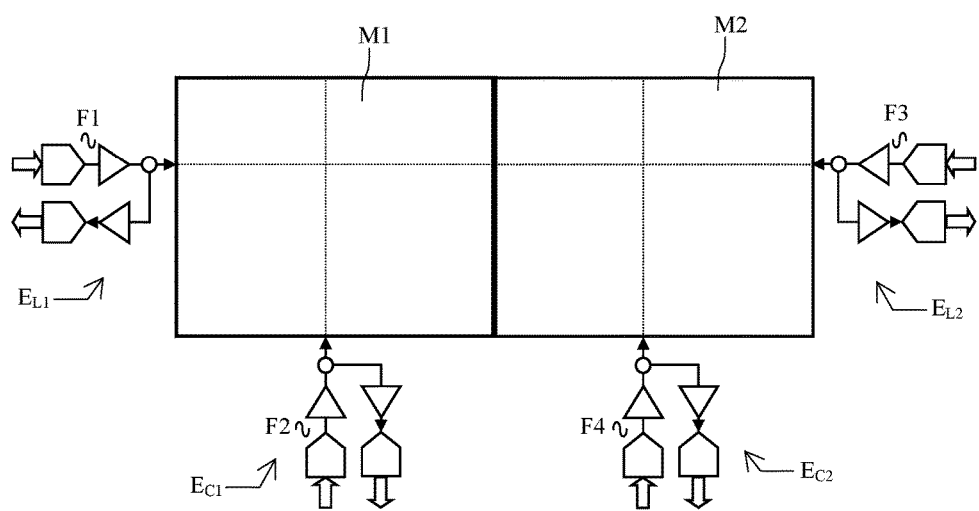
FIG. 2 represents the operation of a display system of large dimensions comprising two matrix touchscreens according to the prior art.
Figure 3:
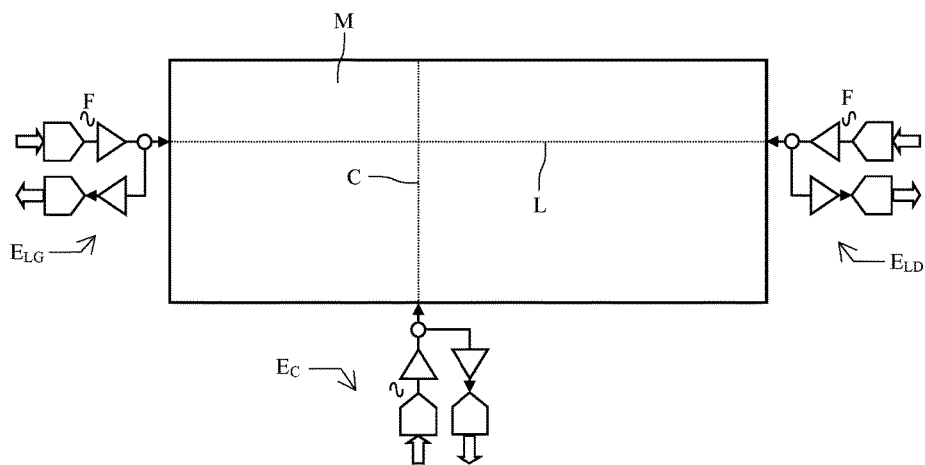
FIG. 3 represents a device with touch surface with projected capacitive detection according to the invention.

The touch device according to the invention comprises:

a matrix touchscreen M comprising a plurality of conductive rows L and of conductive columns C;

electronic control means generating, for each conductive row and for each conductive column, transmission signals and;

electronic means for receiving and analysing the reception signals from each conductive row and each conductive column.

As has been stated, the device according to the invention applies essentially to the touchscreens of which at least one of the dimensions is significant. A significant dimension should be understood to mean a dimension greater than 30 centimeters. It can of course apply to touchscreens of smaller dimensions but with lesser usefulness.

Hereinbelow, the device is applied to the rows L of the matrix M. It can be applied without preference to the columns of the matrix or to the rows and to the columns simultaneously.

In the device according to the invention, each row L comprises, at one of its ends, first means $E_{LG}$ for generating a first transmission signal and first means for receiving a first reception signal and, at its opposite end, second means $E_{LD}$ for generating a second transmission signal and second means for receiving a second reception signal, the first transmission signal and the second transmission signal being synchronous, having the same frequency, the same amplitude and the same phase.

The measurement of the signal can be done by capacitive bridge, by injecting a current and by measuring a voltage or, conversely, by injecting a voltage and by measuring a current.

As an example, the addressing electronics of each row schematically comprises:

a digital-analogue conversion stage DAC, which injects a sinusoidal high frequency voltage denoted V onto the row or the column of the touch surface an analogue-digital conversion stage ADC for measuring the received current.

The measurement of the received current or of the received voltage is ensured by an electronic processing chain, the first reception means and the second reception means comprising synchronous demodulation means.

It will be understood that, if a touch is performed on a row, this touch is necessarily located at most mid-way from one of the ends of the row L. Consequently, at least one of the two signals received by one of the ends has low noise. In any case, it is no more so than on a matrix whose rows have a length two times shorter. Consequently, whatever the position of the touch, at least one of the signals received has low noise.

It is therefore possible to determine, knowing the value of the signals received at the two ends of each row L, whether a row is invoked or not.

The device according to the invention also makes it possible to determine, with good accuracy, the position of the touch on a row invoked by using the ratio of the signals received at the two ends of each row. To this end, the reception means comprise calibration means. In effect, the asymmetries of the electronic circuits used on the left side and on the right side of each row can make the position of the touch detected inaccurate.

The reception means comprise storage means making it possible to ensure this calibration. The latter store:

the reception signals demodulated in the absence of touches, called reference signals, the value of each reference signal from the left end of a row being denoted $M_{REFG}$ and the value of each reference signal from the right end of the same row being denoted $M_{REFD}$. These signals make it possible to calibrate the system;

the reception signals demodulated in the presence of touches, the value of each signal from the left end of a row being denoted $M_G$ and the value of each signal from the right end of the same row being denoted $M_D$.

The simplest ratio called raw ratio $R_B$ to be implemented is as follows:

$$R_B = (M_D - M_{REFD})/(M_G - M_{REFG})$$

A corrected ratio $R_C$ can be used that takes account of the variations of the reference signals. Then:

$$R_C = R_B(M_{REFG}/M_{REFD}).$$

Figure 4:
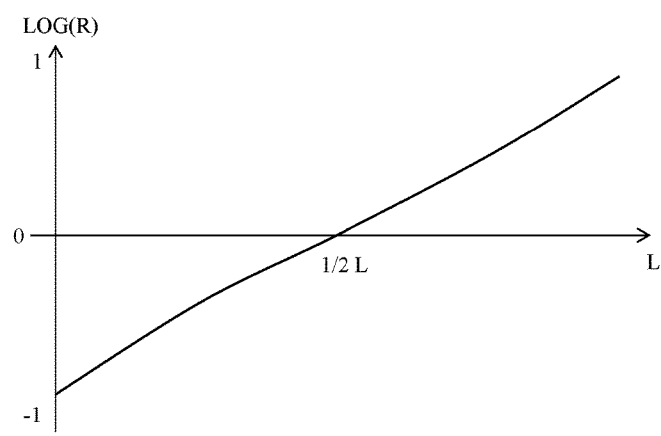
FIG. 4 represents the logarithm of the raw ratio of the difference between the values of the signals received at one end of a row and of the difference between the values of the signals received at the other end as a function of the position of the touch on the row.

It can be demonstrated that the logarithm of these ratios as a function of the position of the touch on the row is almost a straight line as can be seen in FIG. 4 which represents the logarithm LOG(R) of the ratio as a function of the position of the touch on a row L. If the electronics does not exhibit asymmetries, this curve passes through 0 at mid-row, R being substantially 1 at mid-row.

The possibility of simply determining the position of the touch solely by measurements on the rows offers numerous advantages, the measurements on the rows being complemented by measurements on the columns C performed by means of the electronics $E_C$.

Figure 5:
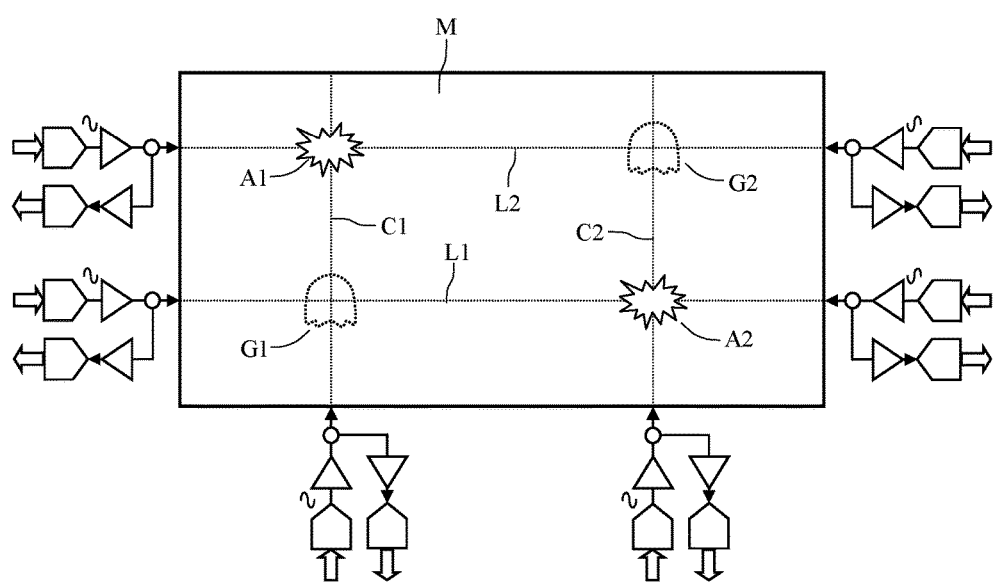
FIG. 5 represents the principle of the detection of phantom touches.

The first of these advantages is the possibility of detecting the phantom touches in case of multiple and simultaneous touches. This problem is illustrated in FIG. 5. A user simultaneously touches at two points A1 and A2 of a matrix M. The coordinates of these two points A1 and A2 are A1 (C1, L2) and A2(C2, L1). If the device performs only a measurement making it possible to detect the rows and the columns invoked, then the device detects that the columns C1 and C2 have been invoked and that the rows L1 and L2 have been invoked, i.e. four possible touches. The first two are the true touches at A1 and A2 and the other two situated at G1 (C1, L1) and G2(C2, L2) are phantom touches without it being possible to simply discriminate the true touches from the phantom touches.

With the device according to the invention, this problem disappears. In effect, the positions of the touches on the rows L1 and L2 are known approximately. It is therefore possible to very easily eliminate the phantom touches G1 and G2.

Another advantage of the device according to the invention is that it facilitates the detection of the rows and of the columns that are cut. In a certain number of applications, particularly in the aeronautical field, the integrity of the touch matrix is fundamental to ensuring the safety of the system. Consequently, it is very important to determine whether the matrix includes or does not include rows or columns that are cut. As a general rule, to deal with this type of situation, three actions have to be undertaken. The cut has to be detected, it has to be located and, if possible, it has to be processed in such a way that the matrix remains operational, even in the presence of the cut.

It is always possible to perform a test either once on power-up, or continuously, as a background task, during a dead time of the scanning cycle making it possible to detect any cuts.

This test can be a test of measurement of the row-column electrical couplings at the intersections in "mutual capacitance" mode or a test of measurement of the impedance or of the current running through the various rows and columns in "self capacitance" mode or a combination of the two preceding tests so as to locate any cut more rapidly.

The device according to the invention facilitates the test for tracking cuts. When the device operates by double injection of signals on the rows and by single injection of signals on the columns, the detection of the cutting of a row is obvious by injecting a signal on one side of the row and by measuring the signal received at the other end of the row.

However, the advantage of the device is essentially allowing the detection of a cut at any time in operational mode. In effect, the time to detect a defect is vitally important in some critical systems such as avionics systems.

When a row is cut, two cases arise. In the first case, the cut is situated outside of the central area of the row. In this case, the ratio $M_D/M_G$ is abnormal, even by taking account of the dispersions of the electronic components. The detection and the approximate locating of the cut are immediate. Since the dimension of the touch surface is significant, a touch risks not being detected if it occurs in the long part of the row close to the cut. It is however detected on the corresponding column and can be confirmed at least in a "single-touch" mode.

In the second case, the cut is situated in the central area of the row, the ratio $M_D/M_G$ is no longer abnormal except if a calibration has been performed to neutralize the dispersions of the electronic components. However, the presence of a touch on the row makes it possible to immediately detect the cutting of the row. In effect, if the touch is made to the left of the cut, the measurement made from the left end of the row is correct whereas the measurement made from the right end of the row gives only background noise. The same reasoning is valid for a touch to the right of the cut. Consequently, the ratio $M_D/M_G$ is abnormal and does not correspond to the values expected in the case of a touch. The touch is detected, as is the cut.

In the case of a cut column operating by single injection, if the cut is close to the injection, the significant variation of capacitance measured relative to the normal makes it possible to detect the cut. Such is no longer the case when the cut is far from the injection, unless the equipped touch surface has been calibrated. In this case, no touch on the cut column is detected. However, if the rows are intact, the touch is detected and located on the rows operating by double injection. Thus, both the touch and the area of the cut column are detected, even the cut column if a calibration has been performed. The fact that no touch is detected on this area of columns makes it possible to detect the presence of a defective column.

The invention claimed is:

1. A device with touch surface with projected capacitive detection comprising:
    a matrix touchscreen comprising a plurality of conductive rows and of conductive columns;
    an electronic controller that is linked to said touchscreen and that is configured to generate, for each conductive row and for each conductive column, transmission signals, the electronic controller comprising a plurality of first and second converters; and
    electronics including a processor and demodulators, the electronics being configured to receive and analyze the reception signals from each conductive row and each conductive column, wherein
    each row comprises, at one of its ends, a first converter of the first converters that is configured to generate a first transmission signal and a first demodulator of the demodulators that is configured to receive a first reception signal and, at its opposite end, a second converter of the second converters that is configured to generate a second transmission signal and a second demodulator of the demodulators that is configured to receive a second reception signal, the first transmission signal and the second transmission signal being synchronous, having the same frequency, the same amplitude and the same phase,
    the first and second demodulators are synchronous demodulators configured to store:
        reception signals demodulated in the absence of touches, called reference signals, the value of each reference signal from the left end of a row being denoted $M_{REFG}$ and the value of each reference signal from the right end of the same row being denoted $M_{REFD}$; and
        reception signals demodulated in the presence of touches, the value of each signal from the left end of a row being denoted $M_G$ and the value of each signal from the right end of the same row being denoted $M_D$, and
    when a touch is detected, the position of said touch is calculated from the raw ratio $R_B$ of the difference between the values of the signals $M_D$ and $M_{REFD}$ and of the difference between the values of the signals $M_G$ and $M_{REFG}$, i.e. $R_B=(M_D-M_{REFD})/(M_G-M_{REFG})$.

2. The device with touch surface according to claim 1, wherein, when a touch is detected, the position of said touch is calculated from the corrected ratio $R_C$ multiplied by the ratio of the signals $M_{REFG}$ and $M_{REFD}$, i.e. $R_C=R_B(M_{REFG}/M_{REFD})$.

3. The device with touch surface according to claim 2, wherein, when the row is cut, depending on the location of the cut, either the ratio between the values of the signals $M_D$ and $M_G$, or the raw ratio $R_B$, or the corrected ratio $R_C$ is altered, making it possible to detect the cut and its location.

4. The device with touch surface according to claim 1, wherein, in case of multiple touches, the values of the demodulated reception signals obtained on the rows and the values of the demodulated reception signals obtained on the columns make it possible to unambiguously determine the location of the multiple touches.

5. The device with touch surface according to claim 1, wherein the transmission frequency is situated between 10 kHz and 300 kHz.

* * * * *